United States Patent
Wunderli

(10) Patent No.: US 9,615,005 B1
(45) Date of Patent: Apr. 4, 2017

(54) IC (INCOGNITO) CAMERA

(71) Applicant: Daniel Wunderli, San Jose, CA (US)

(72) Inventor: Daniel Wunderli, San Jose, CA (US)

( * ) Notice: Subject to any disclaimer, the term of this patent is extended or adjusted under 35 U.S.C. 154(b) by 0 days.

(21) Appl. No.: 15/050,629

(22) Filed: Feb. 23, 2016

(51) Int. Cl.
*H04N 5/225* (2006.01)
*H04M 1/02* (2006.01)

(52) U.S. Cl.
CPC ........ *H04N 5/2252* (2013.01); *H04M 1/0264* (2013.01)

(58) Field of Classification Search
CPC ... H04N 5/2251; H04N 5/2252; H04M 1/026; H04M 1/0264
USPC .......................................... 348/369, 373–375
See application file for complete search history.

(56) References Cited

U.S. PATENT DOCUMENTS

| | | | | |
|---|---|---|---|---|
| 7,414,659 B2 * | 8/2008 | Nagamine | ........... | H04M 1/0264 348/335 |
| 7,873,408 B2 * | 1/2011 | Sato | ........ | A61B 5/117 340/5.83 |
| 7,990,469 B2 * | 8/2011 | Clapper | ........... | H04N 5/2251 348/374 |
| 9,525,806 B2 * | 12/2016 | Suzuki | ........ | H04N 5/2252 |
| 2004/0041935 A1 * | 3/2004 | Nagamine | ........... | H04M 1/0264 348/335 |
| 2004/0120552 A1 * | 6/2004 | Borngraber | ........ | G07C 9/00158 382/115 |
| 2007/0279511 A1 * | 12/2007 | Misawa | ........ | H04N 5/2251 348/333.06 |
| 2008/0180568 A1 * | 7/2008 | Ohnishi | ........ | H04N 5/2252 348/376 |
| 2009/0059043 A1 * | 3/2009 | Demuynck | ........ | H04M 1/0216 348/294 |
| 2009/0093727 A1 * | 4/2009 | Sato | ........ | A61B 5/117 600/476 |
| 2011/0007205 A1 | 1/2011 | Lee | | |
| 2013/0011127 A1 * | 1/2013 | Lawton | ........ | G02B 13/06 396/71 |
| 2013/0176412 A1 | 7/2013 | Chen | | |
| 2013/0188943 A1 | 7/2013 | Wu | | |
| 2015/0172520 A1 * | 6/2015 | Lindman | ........ | H04N 5/2252 382/190 |
| 2015/0311941 A1 * | 10/2015 | Sorrentino | ........ | H04M 1/185 455/575.8 |
| 2016/0088264 A1 * | 3/2016 | Freeze | ........ | H04N 5/2254 348/143 |
| 2016/0182826 A1 * | 6/2016 | Blum | ........ | H04N 5/23241 348/372 |

* cited by examiner

*Primary Examiner* — Pritham Prabhakher
(74) *Attorney, Agent, or Firm* — Andrew Morabito

(57) ABSTRACT

This invention relates to a movable reflective device that allows a user to use a mobile phone camera in an inconspicuous manner. Further, the movable reflective device is adapted to hide a camera of a mobile device while capturing an image or video. Further, the movable reflective device includes a mobile device case and an optical sliding assembly which is removably attached to the case of the mobile device.

11 Claims, 3 Drawing Sheets

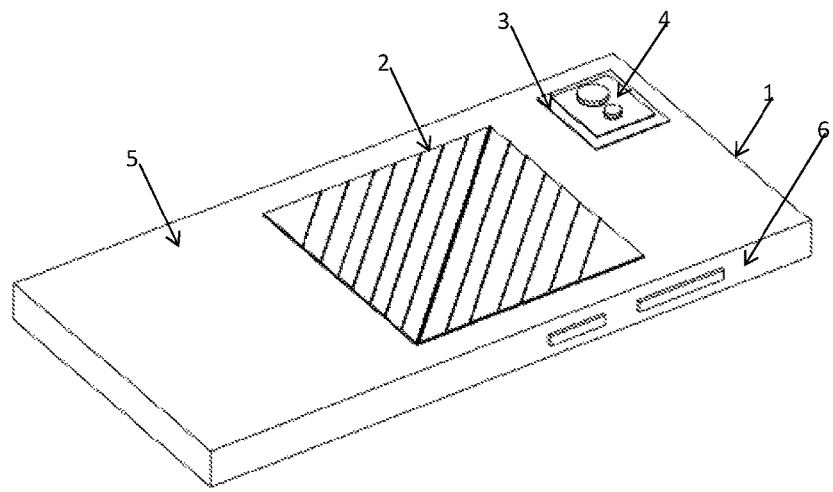
FIG: 1
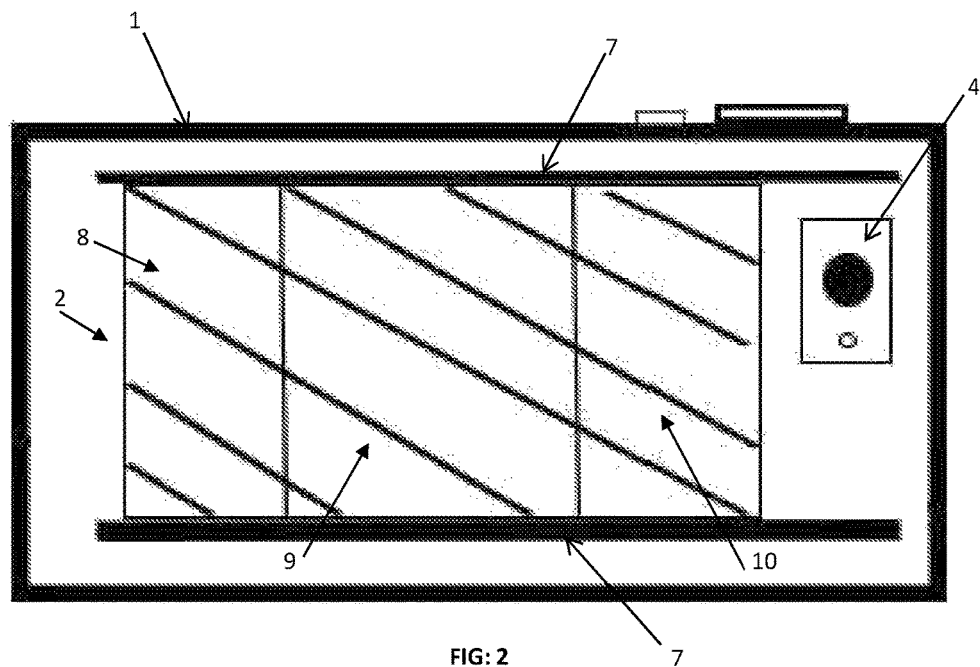
FIG: 2

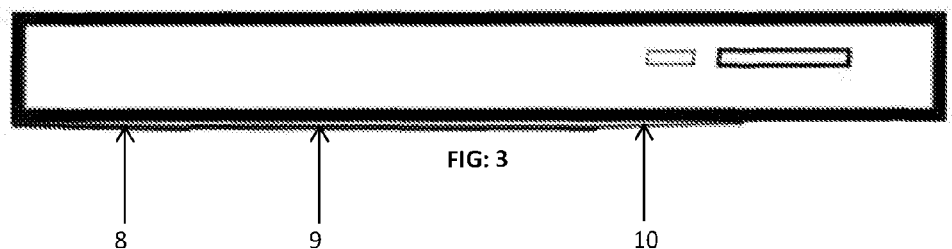
FIG: 3
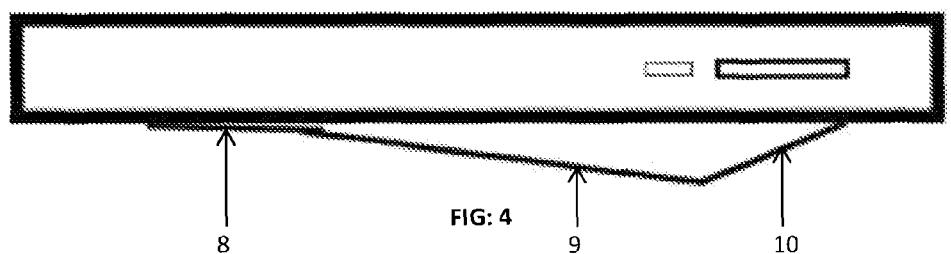
FIG: 4
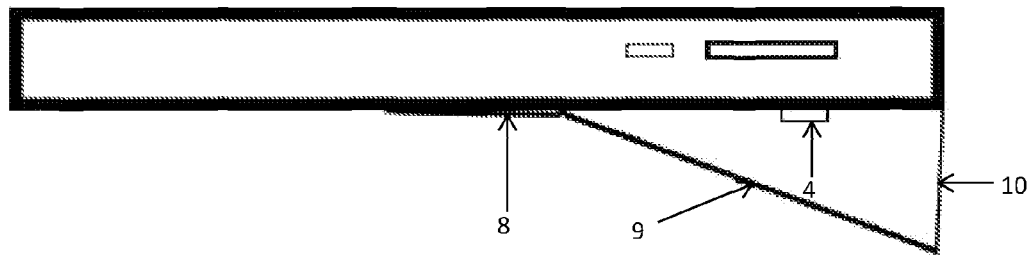
FIG: 5

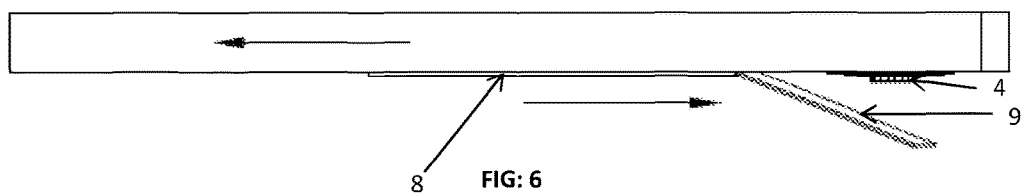
FIG: 6
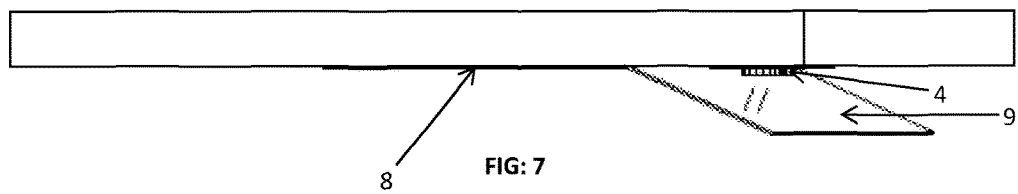
FIG: 7

IC (INCOGNITO) CAMERA

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of Invention

The present invention generally relates to a reflective device. More particularly, the present invention relates to "a reflective device to allow use of camera of a phone in an inconspicuous manner".

(2) Background of Invention

Integration of camera in phone has changed life style of people a lot. Now, whenever or wherever people need to capture picture and video they use the camera in their phone to do so. They are able to take pictures of themselves, friends, family members, monuments and others. There has been lots of advancement in the camera in the phone which help people use the camera more efficiently. For example, there are attachments available for the phone camera to zoom in or take better pictures. There are also device which let use camera for other purposes. For example, U.S. patent application Ser. No. 12/802,470 discusses an adapter attaching to phones to redirect a rear facing camera back to the user to enable simultaneously taking and viewing self-portrait pictures and videos. Similarly, U.S. patent application Ser. No. 13/353,680 discusses an adaptor for a camera in a phone where the adaptor has an image display screen at its one side and a lens at another side to allow self-portrait via front view camera on the phone and also use camera on the back of the phone.

Similarly, U.S. patent application Ser. No. 13/344,563 discusses a self-photographing device for using camera phone to take pictures single-handedly. However, currently there are no systems and methods that allow using camera of a phone to take pictures inconspicuously. Many times people want to take candid shot of their family, friends, kids and others without them noticing that they are being photographed or made video of. Also, police and other armed forces also need to perform surveillance of subjects without breaking the cover. Hence, there is a need for a system which allows using camera of phone to take picture or video without letting the people know that picture or video is being taken. The system should be easy to use. Further, it is required the system can be used with different brands of the phone. Also, the system should be easily removable from the phone for storing.

It is an aspect of the invention to overcome or alleviate a problem of the prior art.

This permits the use of the present invention which enhance the prior art of the system and method of using camera of a phone inconspicuously.

BRIEF SUMMARY OF THE INVENTION

In view of the foregoing, one aspect of the various disclosed embodiments in the present invention is to provide a reflective device to allow use of camera of a phone in an inconspicuous manner.

Preferably the reflective device addresses, or at least ameliorates one or more of the problems described above. To this end, the present invention related to a reflective device, with some unique aspects is disclosed.

Accordingly, it is a primary object of the present invention to provide a movable reflective device to allow use of camera of a phone in an inconspicuous manner. Further, the movable reflective device is adapted to hide a camera of a mobile device while capturing an image or video. Further, the movable reflective device includes a device case and an optical sliding assembly which is removably attached to the case of the mobile device.

In another aspect of the present invention, the optical sliding assembly includes a sliding channel configured within the case, a reflector unit which is positioned substantially between a pushing unit and a concealing unit within the optical sliding assembly. Further, the reflector unit is adapted to redirect image light from outside of the optical sliding assembly to the camera of the mobile device within the case.

In another aspect of the present invention, the optical sliding assembly is configured to move from a first position to a second position whenever a user pushed the optical sliding assembly such that pushing unit, the reflector unit and concealing unit moves from a first location within the sliding channel to a second location within the sliding channel.

In another aspect of the present invention, In the use position, the reflector unit is raised to create an angle between the reflecting surface of the reflector unit and the back surface of the phone to reflect the image into a lens of the camera, thereby allowing a user to take pictures or video of the object.

It is yet another object of the present invention that the movable reflective device is provided for different brands of phone.

It is yet another object of the present invention that the movable reflective device can be easily connected to phone for use and can be easily removed for storage.

It is still another object of the present invention that the movable reflective device is lightweight to allow convenient use with the phone.

Other objects of the present invention will become apparent from time to time throughout the specification as hereinafter related.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which:

FIG. 1 shows a top perspective view of a movable reflective device on a phone;

FIG. 2 shows a top perspective view of a movable reflective device in stored position on a phone;

FIG. 3 shows a side perspective view of a movable reflective device in stored position on a device;

FIG. 4 shows a side perspective view of a movable reflective device changing to use position;

FIG. 5 shows a side perspective view of a movable reflective device in use position;

FIG. 6 shows a side perspective view of a movable reflective device in use position;

FIG. 7 shows another side perspective view of a reflective device in use position with a reflector unit over camera of a phone.

DETAIL DESCRIPTION OF THE INVENTION

The following detailed description of the present invention is enabling teaching of the invention and its best, currently known embodiment. Those skilled in the art can understand that many changes can be made in the embodiments described, while still obtaining beneficial results of the present invention. It will also be apparent that some of the desired benefits of the present invention can be obtained by selecting some of the features of the invention while not utilizing other features. Accordingly, those working in the relevant art will recognize that many adaptations and modification to the present invention can be made and may be desired in certain circumstances, and are part of the present invention. Thus, the following description is provided as illustrative of the principle of the present invention.

Embodiments of the present invention provide a reflective device for hiding a mobile phone camera. Accordingly, the specific embodiments discussed herein are merely illustrative of specific manners in which to make and use this invention, and are not intended to represent an exhaustive list of all possible structure and processes of the present invention.

Embodiments of the reflective device are shown in the FIGS. 1-8, and discussed below. While the structure and processes have been described with a certain degree of particularity, it is to be noted that many modifications may be made in the details of the structure and processes without departing from the spirit and scope of this disclosure. It is understood that the structure and processes are not limited to the embodiments set forth herein for purposes of exemplification.

Now referring to FIG. 1, the present invention provides a movable reflective device which is adapted to allow a user to use the phone camera in an inconspicuous manner. There is shown a preferred embodiment of the present invention, a movable reflective device 2 configured on a mobile case 5. Further, the mobile case 5 is adapted to configure with different type of phone 1 available in the market. Further, The case 5 is designed to completely cover the back side of the phone 1 for better stability. Further, the case 5 is designed to be easily gripped. The case 5 is preferably made of plastic. The case 5 can be provided in different shapes and sizes to cover the back side of different brands of phone. Further, the case 5 includes an aperture 3 that aligns with the lens (not shown) of the camera 4 of the phone 1, wherein the case is an outer body of a mobile device, a PDA, computer, electronic device, digital camera, portable camera device, smart phone, tablet and the like.

Now referring to FIG. 2, in one embodiment of the present invention. The figure illustrates a a movable reflective device which includes a mobile case 5 and an optical sliding assembly 2, wherein an optical sliding assembly 2 includes a sliding channels 7 configured within the case 5, a reflector unit 9 which is positioned substantially between a pushing unit 8 and a concealing unit 10 within the optical sliding assembly. Further, the sliding channels 7 built parallel to each other near edge of the sides of mobile case 5. Further, the reflector unit 9 is adapted to redirect image light from outside of the optical sliding assembly 2 to the camera of the mobile device within the case.

In one embodiment of the present invention, the sliding channel 7 is present from the top end of the phone case 5 up to the two/third length of the back side of the phone case 5. Further, the sliding channels 7 are configured to cover the camera. The sliding channels 7 are preferably made of hard plastic. The sliding channels 7 may be attached to the case 5 with an adhesive or may be molded into the case 5 during the manufacturing of the case 5. Further, the sliding channels 7 include one or more grooves for providing locking mechanism to the optical sliding assembly 2.

In another embodiment of the present invention, the reflector unit 9, the pushing unit 8 and the concealing unit 10 are mounted on the sliding channel 7 to slide over the sliding channel 7. The reflector unit 9 is connected to the pushing unit 8 and the concealing unit 10 via flexible connector, wherein the flexible connector (not shown) is a hinge but not limited to the fasteners, wire, mechanical joint and the like. Further, The reflector unit 9 has its reflecting surface facing down against the back side of the phone case 5.

Further, the bottom end of the concealing unit 10 is attached to the top end of the reflector unit 9 via the flexible connector i.e hinge. The reflector unit 9 is preferably made of a thin mirror. However, The reflector unit 9 can be made from a variety of reflecting material known in the art. Further, the pushing unit 8, the reflector unit 9 and the concealing unit 10 have edge connectors (not shown) located on their edges where they all movably engaged to the sliding channel 7, wherein the edge connectors are adapted to engage with the grooves present in the sliding channel 7 to lock the pushing unit 8, the reflector unit 9 and the concealing unit 10 at a predefined position. Further, the concealing unit 10 is a tinted glass or tinted plastic.

Now referring to FIG. 3, In another embodiment of the present invention, the FIG. 3 illustrate in the stored position of optical sliding assembly 2. Further, as shown in the figures, the pushing unit 8 is present at its lowest position on the sliding channels 7 and the reflector unit 9 and the concealing unit 10 are lying flat against the back surface of the case 5 with the reflecting surface (not shown) of the reflector unit 9 is facing the back surface of the case.

Now referring FIGS. 4 & 5, In another embodiment of the present invention, the FIGS. 4 and 5 illustrate in use position of optical sliding assembly 2 configured on the mobile phone case 5. For using the movable reflective device, the pushing unit 8 is pushed forward by the user, preferably with thumb. As the pushing unit 8 is pushed forward, it slides over the sliding channels till the end point on the sliding channels 7 and locks into place by eventually sliding the edge connectors (not shown) of the pushing unit, and the concealing unit 10 into plastic grooves presents on the sliding channels 7.

In another embodiment of the present invention, optical sliding assembly 2 is adapted to restore its position by moving the pushing unit in backward direction by the user. To move the pushing unit 8 backwards, the pushing unit 8 is raised out of the locked position and pulled back preferably with thumb. Further, the pushing unit 8 can be moved back till it reaches the other end of the sliding channels 7 and again locks into place by eventually sliding the edge connectors into plastic grooves present on the sliding channels 7. While the pushing unit 8 move forward over the sliding channels 7, the reflector unit 16 and the concealing unit 10 get pushed forward on the sliding channels 7 by the pushing unit 8 and start raising the hingely connected bottom end of the concealing unit 10 and the top end of the reflector unit 9 to form an angle between the reflecting surface of the reflector unit 9 and the back surface of the case 5 as shown in FIG. 4.

Further, at this point, the top end of the concealing unit 10 is constantly connected to the sliding channels 7 while the bottom end of the concealing unit 10 is disengaged from the sliding channels 7 and rise up. When the concealing unit 10 reaches the end of the sliding channels 7, the concealing unit 10 gets locked into place, while the reflecting unit 9 continues to move forward to form a right triangle between the reflecting unit, the concealing unit 10 and the back surface of the case 5 (as shown in FIG. 5). Further, the concealing unit 10 forms a 90 degree angle to the back surface of the case 5, while the reflector unit 9 is at the proper angle to the camera lens of the camera 4 to reflect an image directly in front of the top end of case 5. The reflecting surface of the reflector unit 8 is preferably at 45 degree angle relative to the back surface of the mobile phone case 5 for most efficiently reflecting an image directly in front of the top end of the mobile phone case 5 (as shown in FIG. 4). This reflected image is visible to the lens of the camera 4 present at the back surface of the case and can be used for capturing as a photo or video. An app may be provided in the phone to flip around the reflection of the image on the display screen of the phone.

Now referring FIGS. 6 & 7 In another embodiment of the present invention, the figures illustrate in use position and stored position of the movable reflective device as described above without the concealing unit 10.

In yet another embodiment of the present invention, the movable reflective device of the present invention allows a user to take pictures or video of the objects present in the direction aligned with the top end of the phone when the phone is held in the horizontal orientation relative to the ground. For example, when the user is holding the phone while texting, reading or watching media content over the phone, the user can move the movable reflective device in use position by sliding the middle plastic piece and then the reflecting piece reflecting the image of the objects present in the direction of the top end of the phone allows the user to take pictures or video of these objects in an inconspicuous manner.

Advantageously, the movable reflective device of the present invention is highly useful in surveillance of subjects during an investigation. The reflective device being inbuilt in the case keeps the surveillance activity obscured from the subjects. The reflective device is also highly useful to capture candid pictures and videos of kids, friends, family members, pets and others. The reflective device can be easily removed from the phone by removing the case from the phone and the reflective device can then be stored.

It is to be understood that the above description is intended to be illustrative, and not restrictive. For example, the above discussed embodiments may be used in combination with each other. Many other embodiments will be apparent to those of skill in the art upon reviewing the above description.

Whereas, the construction and method have been described in relation to the figures of the drawings, it should be understood that other and further modifications, apart from those shown or suggested herein, may be made within the spirit and scope of this invention.

What is claimed is:

1. A movable reflective device for hiding a camera of a mobile device, the movable reflective device comprising:
    a case which is adapted to configure with a mobile device having a camera;
    an optical sliding assembly which is removably attached to said case of the mobile device, said optical assembly comprises:
    a sliding channel configured within said case, wherein said sliding channel includes one or more grooves;
    a reflector unit which is positioned substantially between a pushing unit and a concealing unit within said optical sliding assembly,
    wherein said pushing unit, said reflector unit, and said concealing unit includes one or more edge connectors, wherein said one or more edge connectors are adapted to connect to said one or more grooves of said sliding channel;
    wherein said reflector unit is adapted to redirect image light from outside of the said optical sliding assembly to said camera of the mobile device within said case; and
    wherein said optical sliding assembly is configured to move from a first position to a second position by a user pushing said optical sliding assembly such that said pushing unit, said reflector unit and concealing unit moves from a first location within said sliding channel to a second location within said sliding channel.

2. The movable reflective device of claim 1, wherein said case is made of plastic, metal and a combination thereof.

3. The movable reflective device of claim 1, wherein said case is an outer body of a mobile device, a PDA, computer, electronic device, digital camera, portable camera device, smart phone, and tablet.

4. The movable reflective device of claim 1, wherein said pushing unit, said reflector unit and said concealing unit are connected with each other via a flexible connector.

5. The movable reflective device of claim 1, wherein said reflector unit and said concealing unit and a back surface of said case is adapted to make a 90 degree angle triangle over said camera, whenever said user pushes said optical sliding assembly in forward direction.

6. The movable reflective device of claim 1, wherein said reflector unit and said concealing unit is adapted lock at a predefined position, once a particular angle has been established.

7. The movable reflective device of claim 1, wherein said reflecting unit includes a reflective surface which is facing down against the back side of said case.

8. The movable reflective device of claim 7, wherein said reflecting unit is a mirror.

9. The movable reflective device of claim 1, wherein said concealing unit is a tinted glass.

10. The movable reflective device of claim 1, wherein said concealing unit is adapted to hide said reflecting unit and said camera.

11. The movable reflective device of claim 1, wherein said camera is adapted to receive said image light from said reflector unit to capture an image or a video.

* * * * *